United States Patent
Shin et al.

(10) Patent No.: US 10,175,688 B2
(45) Date of Patent: Jan. 8, 2019

(54) APPARATUS AND SYSTEM FOR REMOTELY CONTROLLING A MOVING ROBOT AND METHOD THEREOF

(71) Applicant: YUJIN ROBOT CO., LTD., Seoul (KR)

(72) Inventors: Kyung Chul Shin, Seoul (KR); Seong Ju Park, Gunpo (KR); Yeong Il Choe, Incheon (KR); Byung Kwon Moon, Seoul (KR); Jae Young Lee, Gunpo (KR)

(73) Assignee: YUJIN ROBOT CO., LTD., Seoul (KR)

( * ) Notice: Subject to any disclaimer, the term of this patent is extended or adjusted under 35 U.S.C. 154(b) by 146 days.

(21) Appl. No.: 15/261,770

(22) Filed: Sep. 9, 2016

(65) Prior Publication Data

US 2017/0205822 A1   Jul. 20, 2017

(30) Foreign Application Priority Data

Jan. 20, 2016 (KR) .................. 10-2016-0007244
Aug. 26, 2016 (KR) .................. 10-2016-0109292

(51) Int. Cl.

| | | |
|---|---|---|
| *B25J 11/00* | (2006.01) | |
| *G05D 1/00* | (2006.01) | |
| *A47L 11/40* | (2006.01) | |
| *G05D 1/02* | (2006.01) | |
| *G06F 3/0488* | (2013.01) | |
| *G06F 3/0484* | (2013.01) | |

(52) U.S. Cl.
CPC ........ *G05D 1/0022* (2013.01); *A47L 11/4011* (2013.01); *A47L 11/4061* (2013.01);
(Continued)

(58) Field of Classification Search
CPC ... G05D 2201/0203; G05D 2201/0215; G05D 1/0274; G05D 1/0246; G05D 1/0016;
(Continued)

(56) References Cited

U.S. PATENT DOCUMENTS

| | | | | |
|---|---|---|---|---|
| 9,675,226 B2* | 6/2017 | Kim | ...................... | A47L 9/2894 |
| 2005/0171636 A1* | 8/2005 | Tani | ..................... | G05D 1/0276 |
| | | | | 700/245 |
| 2010/0228394 A1* | 9/2010 | Yi | ......................... | G05D 1/0246 |
| | | | | 700/253 |
| 2013/0056032 A1* | 3/2013 | Choe | ..................... | A47L 9/0488 |
| | | | | 134/18 |
| 2013/0326839 A1* | 12/2013 | Cho | ....................... | A47L 9/2805 |
| | | | | 15/319 |
| 2014/0207281 A1* | 7/2014 | Angle | .................. | H04L 12/282 |
| | | | | 700/257 |

FOREIGN PATENT DOCUMENTS

| | | |
|---|---|---|
| KR | 10-2012-0059428 A | 6/2012 |
| KR | 10-2013-0027355 A | 3/2013 |

(Continued)

OTHER PUBLICATIONS

Linkedin Learning Solutions: "SolidWorks 2014 tutorial: Drawing rectangles | lynda.com", Apr. 18, 2014, URL:https://www.youtube.com/watch?v=chq1d7sXVZg.
(Continued)

*Primary Examiner* — Dalena Tran

(57) ABSTRACT

Provided is a remote control apparatus for remotely controlling a moving robot, including: a user interface unit displaying a map associated with a traveling area of a moving robot and receiving a user command associated with an operation of the moving robot; a processor selecting at least a part of the map as a designated area and generating a control signal for remotely controlling the moving robot by considering the received user command; and a wireless communication unit transmitting the generated control sig-
(Continued)

nal to the moving robot and receiving a response signal depending on the control signal from the moving robot.

20 Claims, 10 Drawing Sheets

(52) U.S. Cl.
CPC ........ B25J 11/0085 (2013.01); G05D 1/0016 (2013.01); G05D 1/0044 (2013.01); G05D 1/0214 (2013.01); G05D 1/0246 (2013.01); G06F 3/04883 (2013.01); *G05D 2201/0203* (2013.01); *G05D 2201/0215* (2013.01); *G06F 3/04842* (2013.01)

(58) Field of Classification Search
CPC .. G05D 1/0022; G05D 1/0044; G05D 1/0088; A47L 11/4011; A47L 11/4061; A47L 2201/04; A47L 9/2826; B25J 9/1689; B25J 13/006; B25J 11/0085

USPC ........ 700/257, 245, 253, 264, 65; 701/2, 25, 701/26, 28, 23

See application file for complete search history.

(56) References Cited

FOREIGN PATENT DOCUMENTS

| KR | 10-2014-0066850 A | 6/2014 |
| KR | 10-2015-0014237 A | 2/2015 |
| WO | WO 2015/016580 A1 | 2/2015 |

OTHER PUBLICATIONS

Extended European Search Report for EP Application No. 16188641.1 dated Sep. 8, 2017.

\* cited by examiner

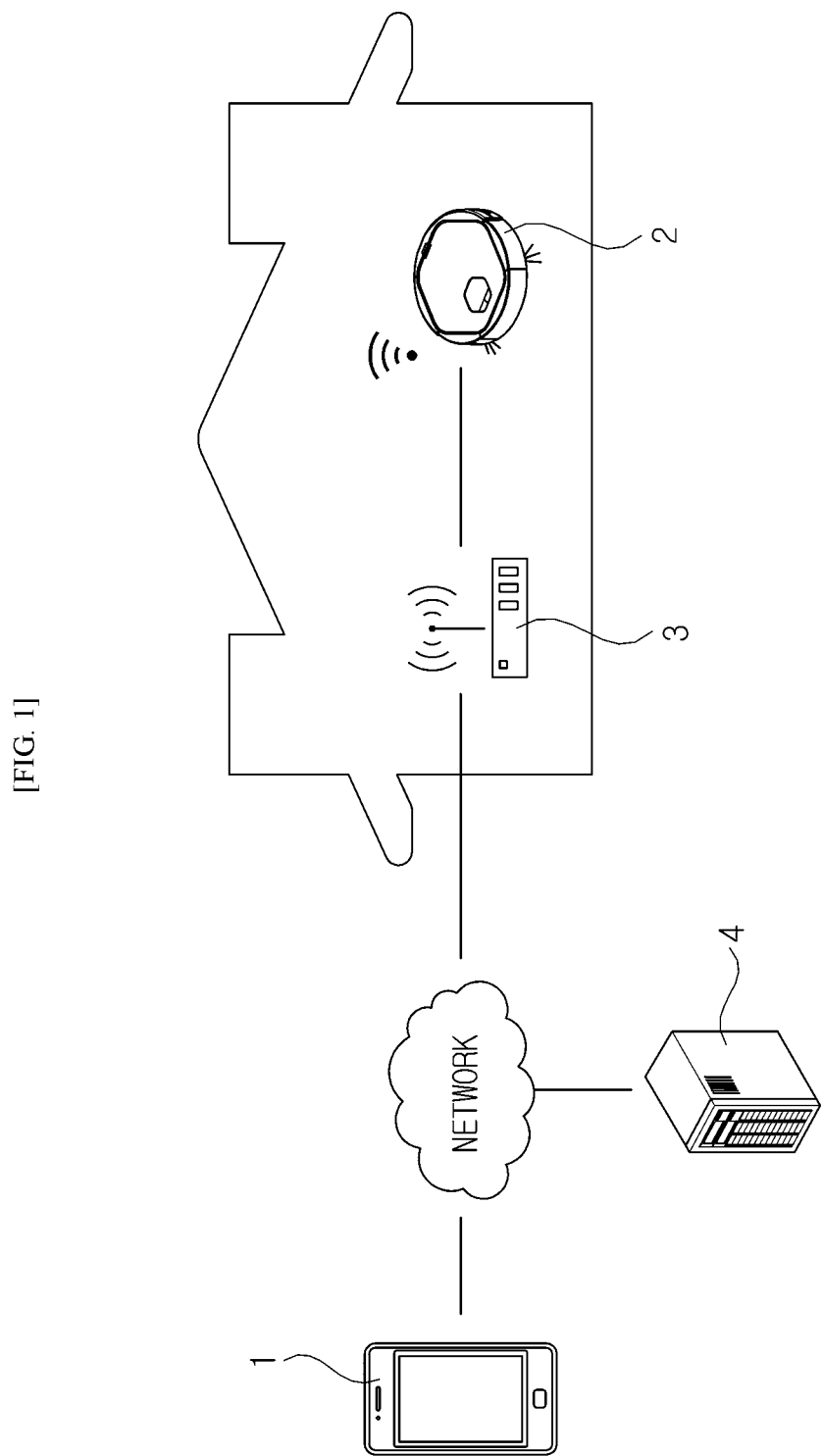
[FIG. 1]

[FIG. 2]
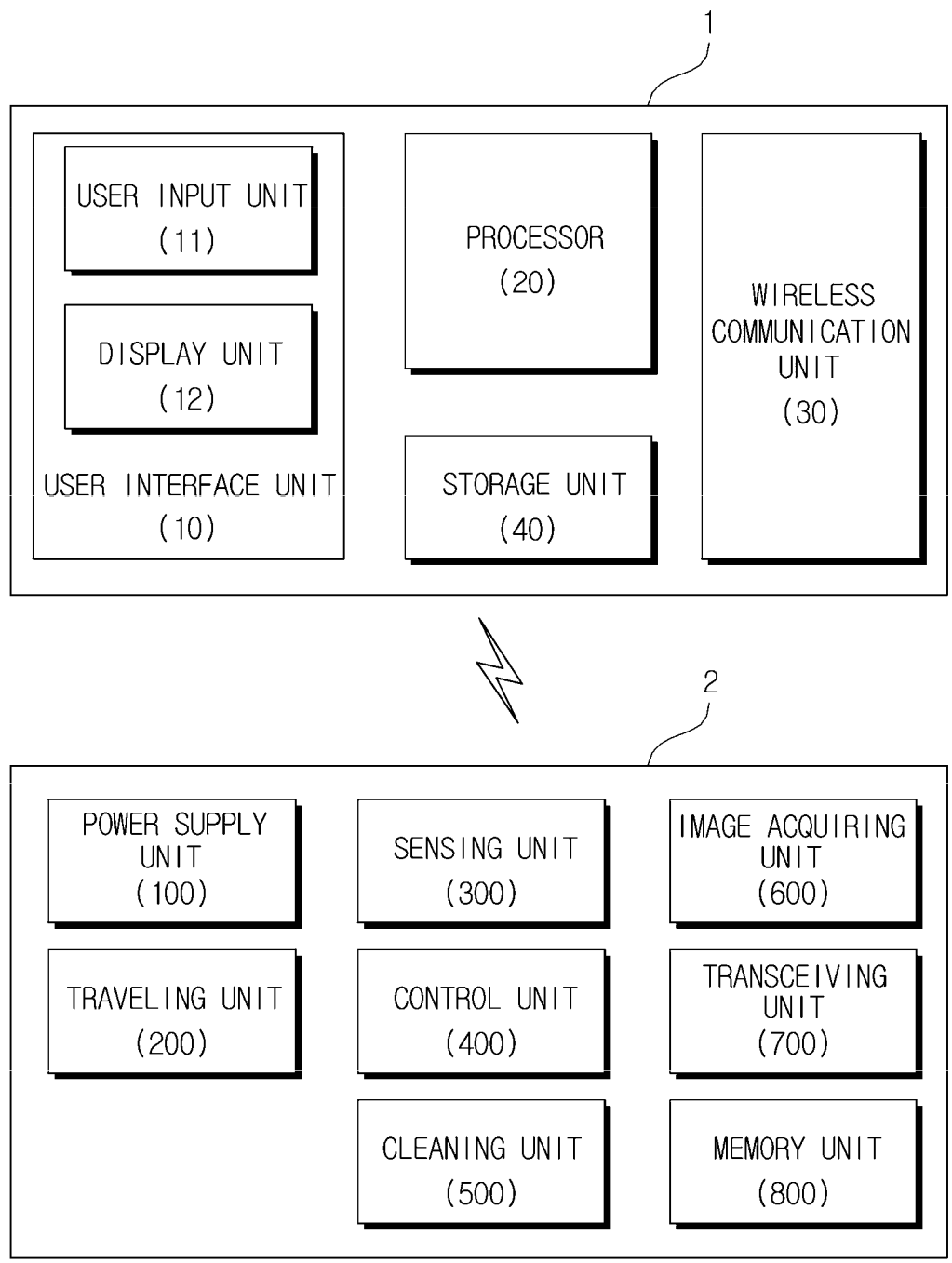

[FIG. 3]
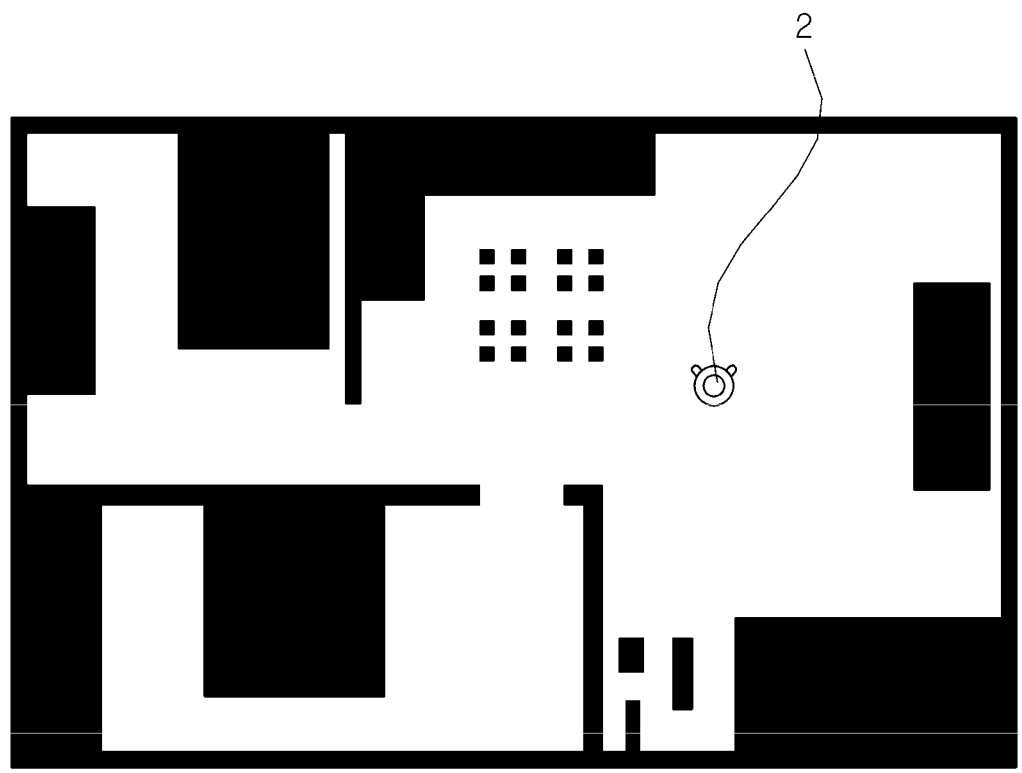

[FIG. 4]
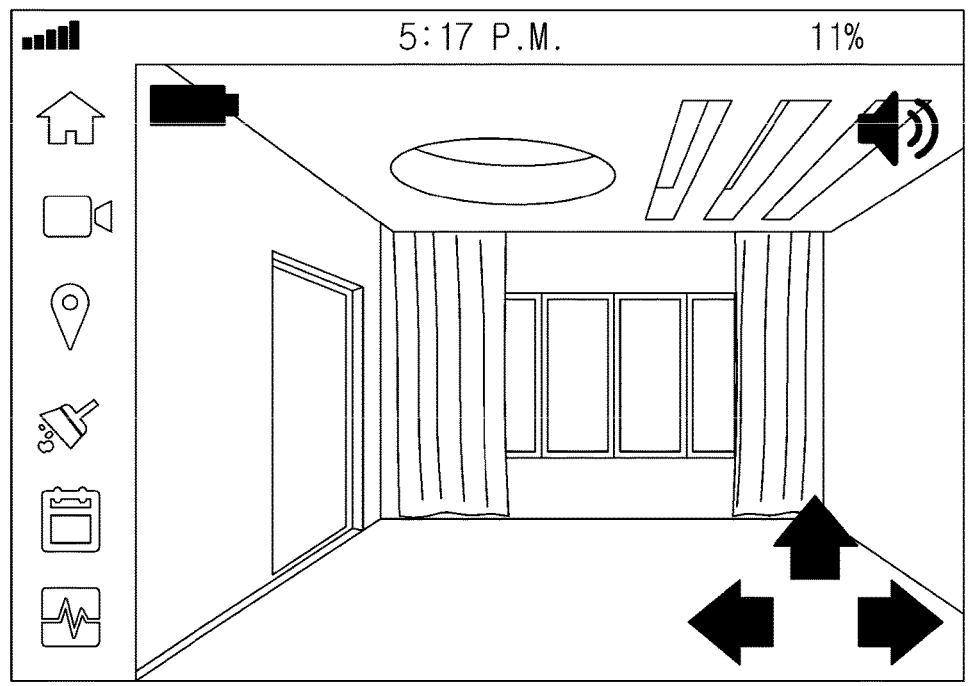

[FIG. 5]
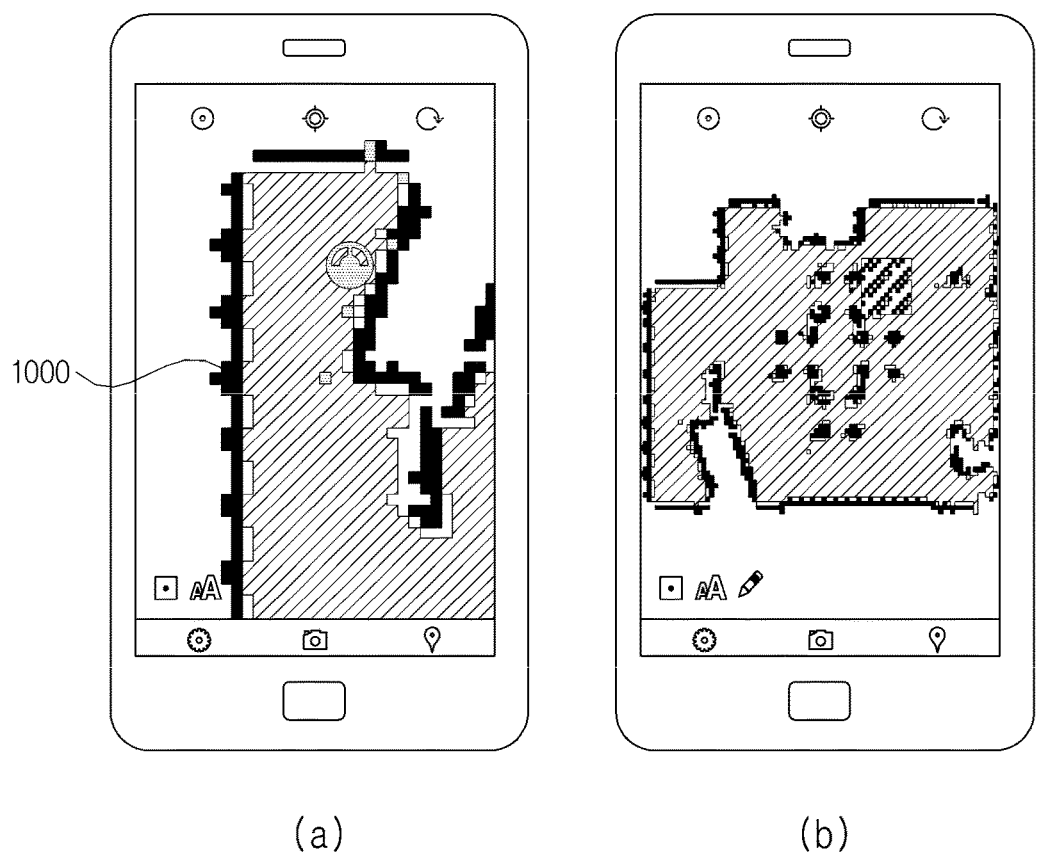
(a)    (b)

[FIG. 6]
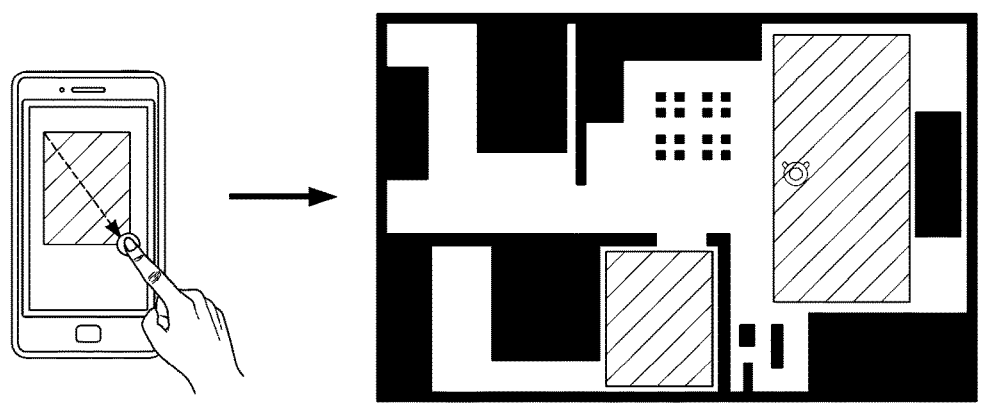

[FIG. 7]
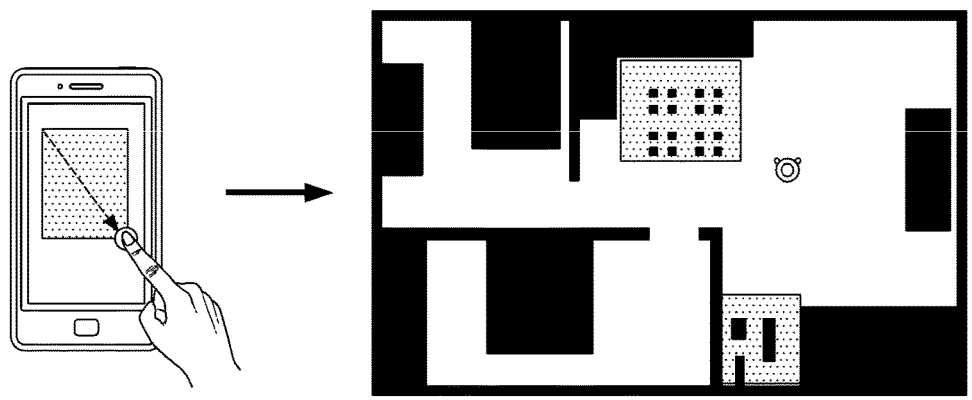

[FIG. 8]
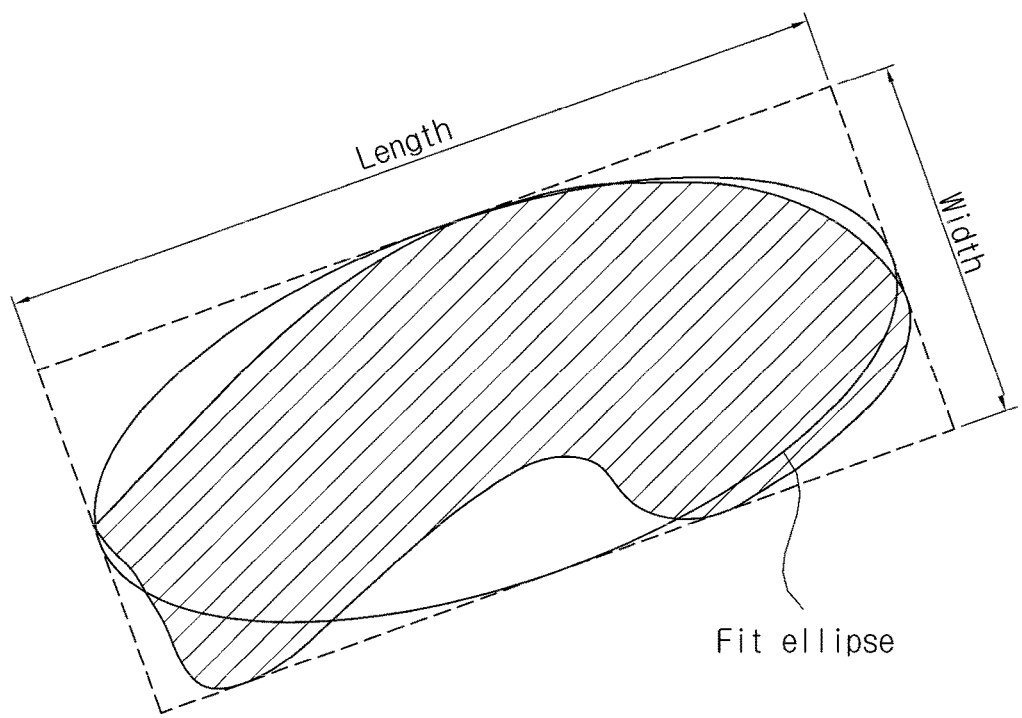

[FIG. 9]
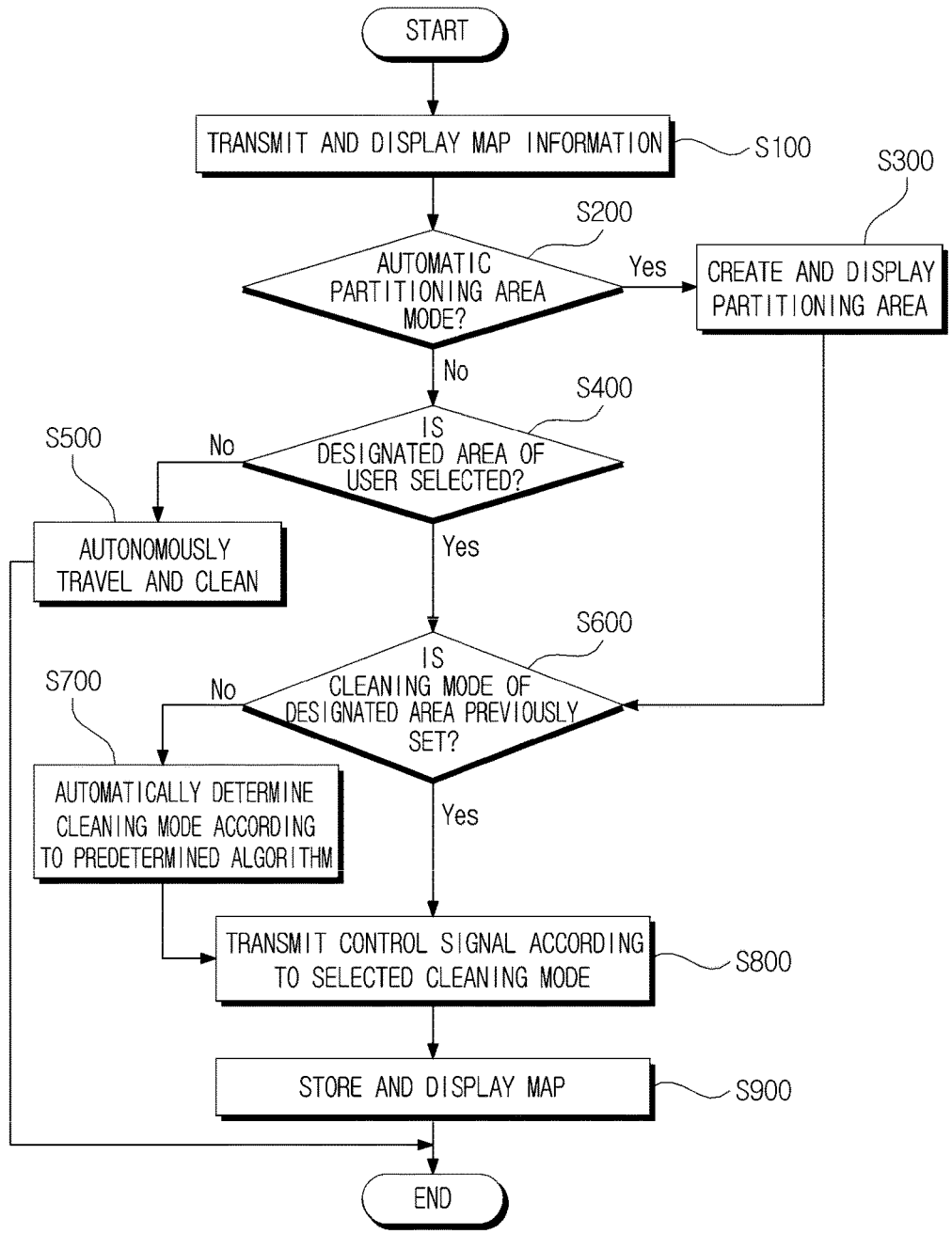

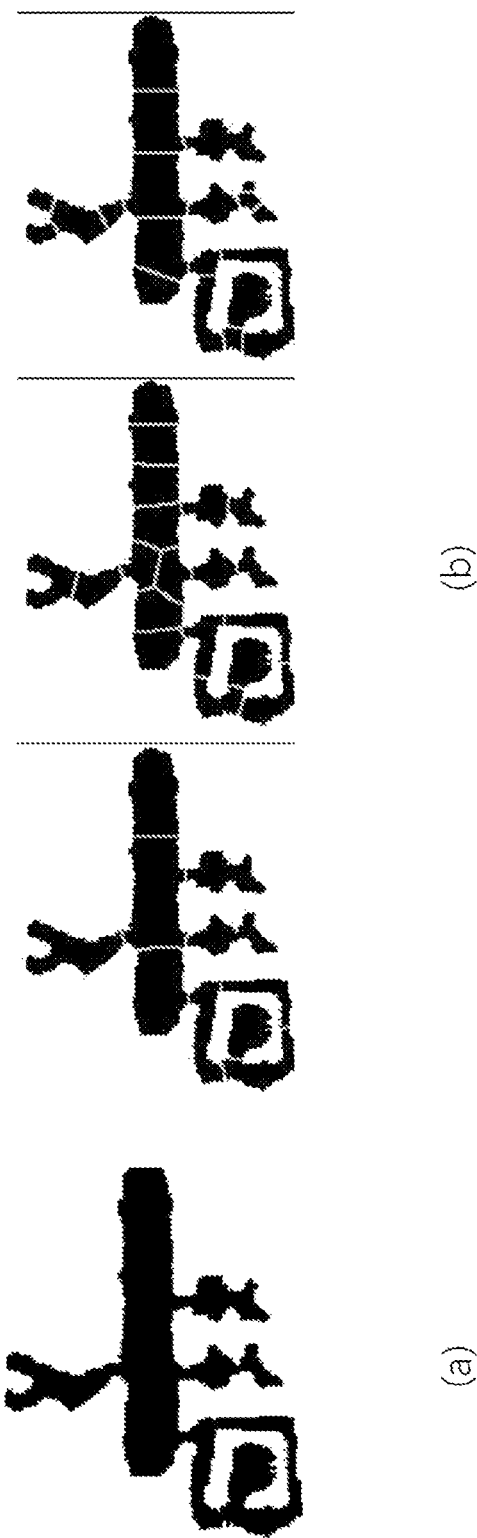
[FIG. 10]

APPARATUS AND SYSTEM FOR REMOTELY CONTROLLING A MOVING ROBOT AND METHOD THEREOF

CROSS-REFERENCE TO RELATED APPLICATIONS

This application claims priority to and the benefit of Korean Patent Application No. 10-2016-0007244 and Korean Patent Application No. 10-2016-0109292 filed in the Korean Intellectual Property Office on Jan. 20, 2016 and Aug. 26, 2016, the entire contents of which are incorporated herein by reference.

TECHNICAL FIELD

The present invention relates to a remote control apparatus for remotely controlling a moving robot, and more particularly, to a remote control apparatus, a remote control system, and a method thereof which control the moving robot by recognizing a designated area according to a command from a user.

BACKGROUND ART

In general, robots have been developed for industries to serve as a part of factory automation. In recent years, as fields that apply the robots have been further extended, medical robots, aerospace robots, and the like have been developed and home robots which can be used in a general home have also been manufactured.

One representative example of the home robots can include a robot cleaner and in this case, the robot cleaner means an apparatus which automatically cleans an area to be cleaned by suctioning foreign materials including dust, and the like from a floor surface while autonomously traveling at the area to be cleaned without an operation by the user. The robot cleaner senses obstacles positioned in the cleaning area, and the like through various sensors, and the like and controls a traveling path and a cleaning operation of the robot cleaner by using a sensing result.

An initial robot cleaner randomly performs cleaning while autonomously traveling and an area where the cleaning cannot be performed by presence of the obstacle and a state of the floor surface may be generated. In order to complement such a disadvantage, in recent years, technologies have been developed, which perform the cleaning by partitioning all areas to be cleaned, that is, an whole cleaning area into a plurality of cleaning areas or cells or perform the cleaning by distinguishing an area at which the cleaning is performed within a prepared cleaning map and an area at which the cleaning needs to be performed by preparing a map for the whole cleaning area.

SUMMARY OF THE INVENTION

The present invention has been made in an effort to provide a method which uses a remote control apparatus controlling a moving robot to allow a user to directly set an area and reduces unnecessary operations of the moving robot by distinguishing a cleaning mode for each area to perform cleaning with high efficiency.

An exemplary embodiment of the present invention provides remote control apparatus including: a user interface unit displaying a map associated with a traveling area of a moving robot and receiving a user command associated with an operation of the moving robot; a processor selecting at least a part of the map as a designated area and generating a control signal for remote controlling the moving robot by considering the received user command; and a wireless communication unit transmitting the generated control signal to the moving robot and receiving a response signal depending on the control signal from the moving robot.

The user command may include a touch input which a user inputs by a touch method in order to designate at least a partial area of the map displayed in the user interface unit.

The moving robot may be a robot cleaner and the processor displays the map and the map may be transmitted from the robot cleaner, and the designated area may include at least one of a first area for intensive cleaning, a second area for avoidance traveling, and a third area for escape traveling.

The touch input which the user inputs by the touch method in order to designate at least the partial area may include a first touch input for designating a first point included in the partial area, a second touch input for designating a second point included in the partial area, and a drag input connected to the second point by starting from the first point.

The designated area depending on the user command may be the first area, and the processor may generate a control signal to increase suction force for suctioning dust, decrease a traveling speed within the designated area, or allow the robot cleaner to repeatedly travel within the designated area, when the robot cleaner travels at the designated area.

The processor may generate partitioning areas acquired by partitioning a map in which the moving robot travels by using a thinning method extracting a boundary for each area or a Voronoi diagram.

The processor may extract coordinates of the designated area selected according to the command of the user and an area with no obstacle in the partitioning area and fits the traveling area of the moving robot in an oval form by considering the extracted coordinates, and set the operation execution direction of the moving robot based on a relatively longer line segment of horizontal and vertical line segments formed by an oval in the area fit by the oval.

The touch input which the user inputs by the touch method in order to designate at least the partial area may include a first touch input for defining the first point included in the partial area, a second touch input for designating a second point included in the partial area and adjacent to the first point, and a third touch input for designating a third point included in the partial area and adjacent to the second point.

Another exemplary embodiment of the present invention provides a moving robot control system including: a moving robot; a user interface unit displaying a map associated with a traveling area of the moving robot and receiving a user command associated with an operation of the moving robot; a processor selecting at least a part of the map as a designated area and generating a control signal for remotely controlling the moving robot by considering the received user command; and a wireless communication unit transmitting the generated control signal to the moving robot and receiving a response signal depending on the control signal from the moving robot.

The user command may include a touch input which a user inputs by a touch method in order to designate at least a partial area of the map displayed in the user interface unit.

The moving robot may be a robot cleaner, and the designated area may include at least one of a first area for intensive cleaning, a second area for avoidance traveling, and a third area for escape traveling.

The touch input which the user inputs by the touch method in order to designate at least the partial area may include a first touch input for designating a first point included in the partial area, a second touch input for designating a second point included in the partial area, and a drag input connected to the second point by starting from the first point.

The moving robot may further include a traveling unit moving the moving robot, a cleaning unit cleaning an area where the moving robot travels, a transceiving unit receiving the control signal from the remote control apparatus and transmitting a response signal depending on the control signal, a sensing unit sensing an operation position of the moving robot according to the control signal, and an image acquiring unit acquiring an image of the traveling area.

The moving robot may further include a map creating unit creating a map associated with the traveling area of the moving robot according to at least one predetermined autonomous traveling mode.

The moving robot may operate by considering the designated area according to the received control signal.

The moving robot control system may further include a server transferring a signal transmitted and received between the moving robot and the remote control apparatus.

Yet another exemplary embodiment of the present invention provides a remote control method for remotely controlling a moving robot, including: creating, by the moving robot, a map by performing at least one predetermined traveling mode; receiving, the remote control apparatus, the created map from the moving robot to receive a user command associated with an operation of the moving robot; selecting, by the remote control apparatus, at least a part of the map as a designated area by considering the user command; and generating, by the remote control apparatus, a control signal for remotely controlling the moving robot.

In the creating of the map, the operation area may be partitioned according to presence of an obstacle to create the map.

The moving robot may be a robot cleaner and the operation may be cleaning and traveling.

Still yet another exemplary embodiment of the present invention provides a computer readable storage medium and a remote control method is executed in a computer.

Accordingly, according to exemplary embodiments of the present invention, a map of a cleaning area can be created and setting the cleaning area can be edited by a user.

While a moving robot performs cleaning, the moving robot can automatically determine whether an environment is changed or changeable and actively cope with the environmental change.

Since a user interface is provided, user convenience for the moving robot can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a diagram illustrating a moving robot control system according to an exemplary embodiment of the present invention.

FIG. 2 is a configuration diagram illustrating a moving robot control system according to an exemplary embodiment of the present invention.

FIG. 3 is a diagram illustrating a map of a place where a moving robot travels according to the exemplary embodiment.

FIG. 4 is a diagram illustrating a user input device for controlling traveling of a moving robot in a remote control apparatus according to an exemplary embodiment of the present invention.

FIG. 5 is a diagram illustrating a scene for verifying a process of creating a map by a moving robot in a remote control apparatus according to an exemplary embodiment of the present invention.

FIG. 6 is a diagram illustrating a scene for setting a first area for intensive cleaning in a designated area according to an exemplary embodiment of the present invention.

FIG. 7 is a diagram illustrating a scene for setting a second area for avoidance traveling in a designated area according to an exemplary embodiment of the present invention.

FIG. 8 is a diagram for describing a method for setting an operation execution direction of a moving robot according to an exemplary embodiment of the present invention.

FIG. 9 is a flowchart schematically illustrating a remote control method for remotely controlling a moving robot according to an exemplary embodiment of the present invention.

FIG. 10 is a diagram illustrating an area partitioned grid map according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, the exemplary embodiments of the present invention will be described in detail with reference to the accompanying drawings and contents disclosed in the accompanying drawings, but the present invention is not restricted or limited to the exemplary embodiment.

Terms used in the specification of the present invention adopt general terms which are currently widely used by considering functions in the present invention, but the terms may be changed depending on an intention of those skilled in the art, customs, and emergence of new technology. Further, in a specific case, a term which an applicant arbitrarily selects is present and in this case, a meaning of the term will be disclosed in a corresponding description part of the invention. Accordingly, we intend to discover that a term used in the specification should be analyzed based on not just a name of the term but a substantial meaning of the term and contents throughout the specification. For example, a specific figure, a structure, and a characteristic described herein may be implemented as another embodiment without departing from a spirit and a scope of the present invention in relation to an exemplary embodiment.

Reference numerals and the same elements will be designated by the same reference numerals and symbols although they are shown in different drawings. Hereinbelow, in describing the present invention, detailed description of associated known function or constitutions will be omitted if they make the gist of the present invention unclear.

Accordingly, a detailed description below is not taken as a limited meaning, and is defined by the accompanying claims together with all equivalent scopes to the claims if the scope of the present invention is appropriately described. Like reference numerals in the drawing denote the same or similar function throughout several aspects.

Hereinafter, a remote control apparatus, a moving robot control system and a remote control method will be described in detail according to exemplary embodiments to be described below with reference to the accompanying drawings. Like reference numerals refer to like elements in the drawings.

FIG. 1 is a diagram illustrating a moving robot control system according to an exemplary embodiment of the present invention. The moving robot control system according to the present invention transfers information acquired from a moving robot 2 to a remote control apparatus 1 through a network to verify an operation state of the moving robot 2, a calculation result, and the like. Further, an action of the moving robot 2, and the like may be adjusted through the network of information input through an input device of the remote control apparatus 1. The moving robot 2 needs to be connected to a router which is a medium for connection with external Internet in order to provide a network based service.

The moving robot control system according to the exemplary embodiment of the present invention includes the remote control apparatus 1, the moving robot 2, a router 3, and an external server 4.

The remote control apparatus 1 generates a control signal from a user, which is used for remotely controlling the moving robot 2 and transmits the generated control signal to the moving robot. The remote control apparatus 1 includes a wireless communication module and for example, includes a cellular phone, a smart phone, a laptop computer, a digital broadcasting terminal, personal digital assistants (PDA), a portable multimedia player (PMP), a navigation, a netbook, a tablet, and the like to be provided in various forms and in the exemplary embodiment, the remote control apparatus 1 is mixedly used with a "user terminal".

As the moving robot 2, for example, a robot cleaner, a hospital service robot, a logistics service robot, a military robot, and an industrial robot may be exemplified and there is no limit in a type of robot. However, in the exemplary embodiment given below, the robot cleaner which is a representative moving robot will be primarily described.

The moving robot 2 responds to a remote control signal from the remote control apparatus 1, performs the resulting operation, and creates a map for a traveling space and transmits the created map to the remote control apparatus 1 through the router 3. In more detail, the moving robot 2 may include a network adapter for connection to a wired or wireless router.

In general, the network adapter operates in a client mode to connect the moving robot 2 to the existing wireless router, but as necessary, the network adapter may serve as Soft AP or infrastructure mode which is a role of the wireless router. Accordingly, when a specific button is pressed in the moving robot 2, the moving robot 2 serves as the router and the remote control apparatus 1 performs communication in connection with the router of the moving robot 2. In this case, the remote control apparatus 1 may transfer to the moving robot 2 information on the existing router to which the moving robot 2 needs to be connected, that is, an SSID, a security protocol, a security algorithm, and key information and the moving robot 2 may receive the information and thereafter, stop the role of the router and be connected to the existing router based on the received information.

The router 3 is a network device which is connected to an Internet line which is input into a home to allow a plurality of software devices to share one Internet line and simultaneously access the Internet while transmitting a radio signal. The router 3 as an access point (AP) performs wireless communication in a wireless communicatable area within a predetermined distance to connect the moving robot 2 to the network.

According to the exemplary embodiment of the present invention, the server 4 may be provided as a relay server or a proxy server which is positioned between the remote control apparatus 1 providing the information and the moving robot 2 to substitutingly bring information requested by the user and transfer the information to the user and further, transfers information provided by the user to the moving robot 2 and temporarily keeps the corresponding information and when the user requests the information again, rapidly transfers the corresponding information to the user without accessing the network again.

The server 4 according to another exemplary embodiment which is operated by a company providing the moving robot 2 is connected with a plurality of moving robots 2 through the network and the moving robot 2 may store IP addresses, serial numbers, IDs, and passwords of the plurality of moving robots 2. Therefore, when the user inputs the ID and the password through the remote control apparatus 1, the moving robot 2 may find the IP address of the moving robot 2 corresponding to the ID and the password and access the robot having the address.

A program for remotely controlling the moving robot 2 may be installed in each of the moving robot and the remote control apparatus. The remote control apparatus 1 accesses the moving robot 2 through the network according to an operation defined by the installed program, outputs a screen capable of controlling the moving robot 2 to a user interface unit 10 of the remote control apparatus 1, and thereafter, inputs a user instruction to control the moving robot in such a manner to transmit the user instruction to the moving robot.

In the exemplary embodiment, the moving robot 2 and the remote control apparatus 1 are first connected to the server 4 to acquire identification information of a counterpart and positional information on the network of the counterpart and thereafter, be mutually connected apart from the server 4.

FIG. 2 is a configuration diagram illustrating a moving robot control system according to an exemplary embodiment of the present invention.

Referring to FIG. 2, the remote control apparatus 1 includes the user interface unit 10, a processor 20, and a wireless communication unit 30.

In the exemplary embodiment, the user interface unit 10 displays a map associated with the traveling area of the moving robot 2 and receives a user command associated with the operation of the moving robot 2. The user interface unit 10 may receive the user command for controlling the moving robot 2 or display information associated with the moving robot 2, for example, a current cleaning state (display a cleaned area, display a ratio of a cleaning completed area to a whole area, display a remaining cleaning time, and the like).

The user interface unit 10 may include a user input unit 11 and a display unit 12. The user input unit 11 is exemplified as a touch screen for receiving the user command and the display unit 12 performs signal processing for displaying the map, a user command input screen, and a cleaning state information display screen on the touch screen in the form of an image or a text.

The processor 20 selects at least a part of the map as the designated area and generates a control signal for remote controlling the moving robot by considering the user command received from the user interface unit 10. Further, the processor may perform signal processing required so that the wireless communication unit 30 receives map data received from the robot cleaner and displays the transferred map data on the screen of the remote control apparatus which is the user terminal through the user interface unit 10.

In the exemplary embodiment, the map displayed on the screen of the remote control apparatus is preferably a map based on the map data generated by the robot cleaner. The robot cleaner may store the map data for the corresponding area which is previously stored or generate the map data recognized and generated according to a path where the moving robot moves while starting traveling regardless of the stored map data in real time.

The remote control apparatus 10 may store the map data for the area to be cleaned as history information and in this case, the processor 20 compares map data which is transferred from the robot cleaner and updated with the previously stored map data and when it is determined that both map data are similar to each other according to a result of the comparison, the processor 20 may control the display unit so as to display the previously stored map data on a user screen. Herein, the processor may determine whether an outline recognized in each map and feature points constituting the outline are similar to each other by using a positional relationship between the outline and the feature points.

In more detail, the processor 20 matches at least some of the feature points extracted in the respective maps with each other, makes map sizes be the same as each other through scale control with respect to some of the matched feature points, and thereafter, uses similarity distances among the corresponding feature points to determine whether the maps are similar to each other. For example, by using methods such as a Euclidean distance, a Cosine distance, a Mahalanobis's distance, and a Manhattan distance as the similarity distances, the processor 20 may determine similarity among the maps.

The processor 20 simultaneously overlaps a map depending on the previously stored map data and a map depending on the map data received from the robot cleaner in real time to display the overlapped map on the screen. In this case, only one map selected between both maps may be displayed according to an operation by the user and when the similarity among the maps is calculated to be low as a predetermined level or less, only the map received from the robot cleaner may be determined to be displayed on the screen instead of the previously stored map data. In the exemplary embodiment, when the map is displayed on the screen by using the previously stored map data, a burden of processing associated with the map data displayed on the screen may be reduced and since the user may rapidly designate the designated area, cleaning efficiency may be improved.

FIG. 3 is a diagram illustrating a map of a place where a moving robot 2 travels according to the exemplary embodiment. Referring to FIG. 3 for more detailed description, for example, when it is assumed that a place where the moving robot 2 is positioned is a home, the map represents a map showing a structure in a house including an area where the moving robot travels.

In a method for generating the map according to an exemplary embodiment, when traveling and cleaning operations of the moving robot 2 start, a ceiling image is acquired by using a rotatable image acquiring unit 600, the acquired ceiling image is analyzed, and the moving robot 2 moves to a center position of the corresponding area where the moving robot 2 is positioned.

The moving robot 2 acquires a front image at a predetermined angle and transmits the acquired front image to the remote control apparatus 1. The processor 20 of the remote control apparatus 1, which receives the image extracts a feature point of the received image, compares and analyzes the extracted feature point with feature points of a previously stored template image, and sets a position where the extracted feature point an the previously stored feature point match each other as a "start point", and the processor 20 generates and transmits the control signal in order to give a traveling command to the moving robot 2.

The moving robot 2 that receives the control signal moves to the "start point" to travel and recognizes a wall surface of a traveling place and extracts an outer area, and creates the map. The map creating process may be implemented so that data acquired from the moving robot 2 is provided to the remote control apparatus 1, and as a result, the processor 20 may generate the data and the control unit 400 may immediately generate the data.

The user input unit 11 which is used for receiving a command of the user, such as a touch may be exemplified as a graphical user interface (GUI) for inputting the touch or a touch panel including software for inputting the touch. The touch panel may be implemented in a form to configure a mutual layer structure with the display unit 12. The user input unit 11 may be implemented in forms of hardware devices including various buttons or switches, pedals, keyboards, mousse, track-balls, various levers, handles, or sticks for the input of the user as well as the touch panel form.

The display unit 12 provides the map received from the moving robot to the user through a visual screen. Further, the display unit 12 may provide acoustic type information to the user through a speaker. In particular, the display unit 12 may generally include a liquid crystal touch panel and a driving unit for driving the touch panel, but the present invention is not limited thereto. The display unit 12 may display the map or information depending on the signal from the processor 20 on the screen.

FIG. 4 is a diagram illustrating a user input device for controlling traveling of a moving robot in a remote control apparatus according to an exemplary embodiment of the present invention.

Referring to FIG. 4, the image acquired from the image acquiring unit 600 of the moving robot 2 is displayed in the display unit 12, three buttons showing movement directions are provided in the user input unit 11 which configures a layer form with the display unit 12, and commands including the movement direction and whether the moving robot 2 travels are connected to the respective buttons. When the user presses the button, the commands of the corresponding movement direction and the traveling start are transferred to the moving robot 2 through the network and the moving robot 2 analyzes the commands to start traveling in the corresponding movement direction.

FIG. 5 is a diagram illustrating a scene for verifying a process of creating a map by a moving robot 2 in a remote control apparatus 1 according to an exemplary embodiment of the present invention.

FIG. 5A is a diagram illustrating a scene in which the remote control apparatus 1 verifies a process in which the moving robot 2 updates map information and FIG. 5B is a diagram illustrating map information after the moving robot completes cleaning in the remote control apparatus.

The moving robot 2 transfers map information generated or updated while cleaning and positional information on the map of the moving robot 2 to the remote control apparatus 1 through the network. In more detail, map information 1000 generated in real time as the moving robot 2 travels may be distinguished and displayed as illustrated in FIG. 5. As a result, the user may verify a step of creating a map such as a map created up to now or a map which has been created through the remote control apparatus 1 with respect to the map information 1000 generated from the moving robot 2.

The remote control apparatus 1 express map information having an array of a square lattice in an output device to allow the user to verify the map information. In particular, the remote control apparatus 1 helps the user to more accurately appreciate the cleaning state in order to express respective square lattices with different colors according to distinguishment of a region.

The processor 20 selects at least a part of the map as the designated area and generates a control signal for remote controlling the moving robot 2 by considering the user command received from the user. The user command according to the exemplary embodiment of the present invention represents a touch input for designating at least a partial area of the map displayed in the user interface unit 10. Herein, the touch input for designating at least a partial area of the map will be described in more detail with reference to FIG. 4.

In the exemplary embodiment, the moving robot 2 starts to create the map illustrated in FIG. 5 while starting traveling and in this case, the generated map data depends on a traveling mode of the moving robot. The traveling mode of the moving robot is not particularly limited, such as a random mode, a zigzag mode, a SLAM mode, and the like. However, in order to rapidly determine the similarity between the map previously stored in the remote control apparatus or the moving robot and the map created by the moving robot, outer information of the area may be preferentially required. In this case, a mode is preferable, in which the moving robot first travels in the outer area in order to specify the outer area and a mode to perform a mode in which the moving robot travels inside the specified outer area in a second order.

FIG. 6 is a diagram illustrating a scene for setting a first area for intensive cleaning in a designated area according to an exemplary embodiment of the present invention.

In more detail, in order to designate a partial area of the map, the touch input which the user inputs by a touch method includes a first touch input for designating a first point included in the partial area, a second touch input for designating a second point included in the partial area, and a drag input connected to the second point by starting from the first point. As one example of the touch method which may be variously implemented, the first point which is one apex in the designated area to be selected in the map is selected and touched and the first point is dragged up to the second point which is the apex of a point facing the first point and thereafter, when the touch is released, one area having a quadrangular structure is selected.

According to another exemplary embodiment, area setting using the touch input of the user may be implemented so as to select one area having the quadrangular structure when the first point which is one apex in the designated area to be selected in the map is selected and touched and thereafter, the second point which is the other one apex is selected and touched and the first and second points are dragged.

Yet another example different from two designated area selecting methods may include a first touch input to define the first point included in the partial area, a second touch input for designating the second point included in the partial area and adjacent to the first point, and a third touch input for designating a third point included in the partial area and adjacent to the second point. For example, the user may select the first point, the second point, and the third point to be selected and select an area formed by linking two points among the first, second, and third points by two line segments that forms 90° as the designated area.

The designated area selecting method by the user is not limited to the aforementioned exemplary embodiments but may be selected in various types of structures according to various methods.

In this case, the designated area depending on the user input is an area including at least one of a first area for the intensive cleaning, a second area for the avoidance traveling, and a third area for escape traveling.

As one example, the designated area according to the user command is the first area for the intensive cleaning and when the robot cleaner 2 travels in the designated area, the processor 20 generates a control signal to increase suction force for suctioning dust, decrease a traveling speed within the designated area, or allow the robot cleaner 2 to repeatedly travel within the designated area.

FIG. 7 is a diagram illustrating a scene for setting a second area for avoidance traveling in a designated area according to an exemplary embodiment of the present invention. Referring to FIG. 7, when the designated area selected by the user is the avoidance traveling area, the robot performs an avoidance traveling operation which does not approach the corresponding region.

The processor 20 of the remote control apparatus 1 may control respective components of the remote control apparatus 10, that is, the wireless communication unit 30, the user interface unit 10, and a storage unit 40 based on the user command input through the user interface unit 10.

The processor 20 may generate the control signal for the wireless communication unit 30. For example, when the user inputs a "designated area setting" command, the processor 20 generates the control signal and transmits the generated control signal through the server 3 in order to command the designated area selected by the user to the moving robot 2. As another example, when the user inputs a "map creation" command, the processor 20 may generate the control signal so as to transmit the map creation command to the moving robot 2. The processor 20 may generate the control signal so as to receive cleaning history data from the moving robot 2. As described above, the processor 20 of the remote control apparatus 1 generates all control signals for transmitting the signal to the moving robot 2.

FIG. 8 is a diagram for describing a method for setting an operation execution direction of a moving robot according to an exemplary embodiment of the present invention. Referring to FIG. 8, the processor 20 extracts coordinates of the designated area selected according to the command of the user and an area with no obstacle in the partitioned areas and fits the traveling area of the moving robot in an oval form by using the extracted coordinates. The processor 20 sets the operation execution direction of the moving robot based on a relatively longer line segment of horizontal and vertical line segments formed by an oval in the area fit by the oval.

As one example, when the processor 20 generates a control signal for a cleaning execution command for the designated area selected by the user, the sensing unit 300 of the moving robot 2 senses the obstacle within the selected designated area and transmits a coordinate of an area without the sensed obstacle to the processor 20 in order to reduce unnecessary traveling rpm of the moving robot 2. The processor 20 fits a cleaning traveling area of the moving robot 2 in the oval form by considering the transmitted coordinate. Based on a direction having a relatively larger length of a width and a length forming the area as illustrated in FIG. 8 among the areas fit in the oval form, the moving robot 2 may be configured to perform a cleaning operation in the corresponding direction.

Referring back to FIG. 2, the wireless communication unit 30 transmits the generated control signal to the moving robot 2 and receives a response signal according to the control signal from the moving robot.

The wireless communication unit 30 transmits and receives various signals and data to and from the moving robot 2 or the external server 3 through wired/wireless communication. For example, the wireless communication unit 30 may download an application for managing the moving robot 2 from the external server 3 according to the user command through the user interface unit 10. Further, the wireless communication unit 30 may download a map of a cleaning area from the external server.

The wireless communication unit 30 may transmit the "map creation" map of the user to the moving robot 2 and receive the created map. Further, the wireless communication unit 30 may transmit a map edited by the user to the moving robot 2. The wireless communication unit 30 may transmit a set or edited cleaning schedule to the moving robot 2. The wireless communication unit 30 may receive cleaning history data from the moving robot 2. Herein, the cleaning history data may include an area of the cleaning area, the traveling speed for the cleaning area, power consumption, a required cleaning time, and the like formed according to a cleaning history of the moving robot 2.

The wireless communication unit 30 may transmit a "cleaning start" command or "cleaning end" command input by the user to the moving robot 2.

To this end, the wireless communication unit 30 may include various communication modules including a wireless Internet module, a short-range communication module, a mobile communication module, and the like.

The wireless Internet module means a module that performs communication in connection with an external network according to communication protocols including wireless LAN (WLAN), Wi-Fi, Wireless broadband (Wibro), World Interoperability for Microwave Access (Wimax), High Speed Downlink Packet Access (HSDPA), and the like.

The short-range communication module means a module for performing communication with an external apparatus positioned within a short range according to a short-range communication schemes including Bluetooth, radio frequency identification (RFID), infrared data association (IrDA), ultra wideband (UWB), ZigBee, and the like.

The mobile communication module means a module that performs communication by accessing a mobile communication network according to various mobile communication standards including $3^{rd}$ generation (3G), $3^{rd}$ generation partnership project (3GPP), long term evolution (LTE), and the like.

However, the present invention is not limited thereto and if the wireless communication unit 30 may communicate with the moving robot 2 and the external server 3, the wireless communication unit 30 may adopt communication modules of other types except for the aforementioned modules.

The storage unit 40 stores temporarily or non-temporarily data and a program for operating the remote control apparatus 1. For example, the storage unit 40 may store the application for managing the moving robot 2. The storage unit 40 may store the received map or the edited map and store map information including partitioned areas in which an avoidance area and an intensive area are distinguished.

The moving robot 2 includes a power supply unit 100, a traveling unit 200, a sensing unit 300, a control unit 400, a cleaning unit 500, an image acquiring unit 600, a transceiving unit 700, and a memory unit 800.

The power supply unit 100 may be implemented by a battery and supplies driving power for driving the moving robot 2.

The traveling unit 200 includes a driving motor (not illustrated) and a driving wheel driven by driving force of the driving motor.

The sensing unit 300 of the moving robot 2 may include various sensors. For example, the sensing unit 300 may include an obstacle sensor, a floor sensor, and a vision sensor.

As an example, the obstacle sensor may be provided as a contact sensor according to a contact with the obstacle, provided as a non-contact sensor, or provided in a combination of the contact sensor and the non-contact sensor. The contact sensor means a sensor of sensing the obstacle when the main body of the moving robot 2 actually collides with the obstacle, and the non-contact sensor means a sensor of pre-sensing the obstacle when the main body of the moving robot does not collide with the obstacle or before colliding with the obstacle. The non-contact sensor may include an ultrasonic sensor, an optical sensor, an RF sensor, or the like.

The floor sensor includes various types of optical sensors and may sense a distance from the bottom to the moving robot 2 or a distance between the bottom and the lower surface of the main body of the moving robot 2. Further, the floor sensor may be implemented by sensors including a slope switch, an acceleration sensor, or a gyro sensor.

The vision sensor means a sensor for recognizing a location of the moving robot 2 and forming a map for traveling or a traveling area of the moving robot 2.

The vision sensor may be implemented by including the image acquiring unit 600 such as a camera, extracts feature points from image data acquired from the image acquiring unit 600, and recognizes the location of the moving robot 2 by using the feature points. Location information sensed through the vision sensor may be transmitted to the control unit 400.

Sensor values extracted by the sensing unit 300 are transmitted to the control unit 400 and the control unit 400 may generate a map for a cleaning area on the basis thereof. A method for generating the map based on the sensor values is a known technique and the detailed description thereof will be omitted hereinafter. Further, when the sensing unit 400 may generate the map for the cleaning area, different types of sensors may be further included or some sensors may be omitted.

The control unit 400 controls an overall operation of the moving robot 2. The control unit 400 may control the power supply unit 100, the traveling unit 200, the sensing unit 300, the cleaning unit 500, the image acquiring unit 600, the transceiving unit 700, the memory unit 800, and the like.

As an example, the control unit 400 may control the driving wheel of the traveling unit 200 to be driven when receiving a "map creation" command from the transceiving unit 700. While the traveling unit 200 is traveled, the control unit 400 receives the sensor values from the sensing unit 300 and may generate a map for the cleaning area based thereon.

The cleaning unit 500 performs a cleaning operation while the moving robot 2 is traveled according to a user's command. The cleaning unit 500 according to the exemplary embodiment of the present invention may be implemented by mounting various cleaning tools including an absorption motor, a brush motor, and the like so as to perform the cleaning operation by absorbing foreign substances including dust and the like from the bottom of the cleaning area where the moving robot 2 is traveled according to a control signal of the control unit 400.

The image acquiring unit 600 according to the exemplary embodiment of the present invention is provided in the main body of the moving robot 2 and may be implemented as a camera which acquires the images related with the cleaning operation of the traveling moving robot 2.

The transceiving unit 700 transceives various signals and data from a remote control apparatus 1 through wired/wireless communication. For example, the transceiving unit 700 may receive the "map creation" command of the user from the remote control apparatus 1 and transmit the generated map to the remote control apparatus 1. Further, the transceiving unit 700 may receive a cleaning start command or a cleaning end command of the user from the remote control apparatus 1.

The memory unit 800 stores temporarily or non-temporarily data and programs for the operation of the moving robot 2. The memory unit 800 may store cleaning history data and the cleaning history data may be periodically or aperiodically updated. When the control unit 400 generates or updates the map, the memory unit 800 may store the generated map or the updated map.

Hereinafter, a remote control method of remotely controlling the moving robot according to an exemplary embodiment of the present invention will be described in detail.

The moving robot 2 receives a map creation mode according to a user's command. The moving robot performs at least one pre-stored traveling mode in order to generate the map. Herein, as the pre-stored traveling mode, the moving robot 2 travels in a traveling area in one traveling mode of various traveling modes including a zigzag mode, a helical mode, a spiral mode, and the like, and the control unit 400 generates the map by using the sensing values measured by the sensing unit 300.

FIG. 9 is a flowchart schematically illustrating a remote control method for remotely controlling a moving robot according to an exemplary embodiment of the present invention.

Referring to FIG. 9, the remote control apparatus 1 receives the map generated from the moving robot 2 and displays the map on a display unit 12 (S100).

The user verifies the map displayed on the display unit 12 and determines whether to generate automatic partitioned areas (S200). When a current mode is an automatic partitioned area mode, the processor 20 generates partitioned areas by partitioning an area included in the current map according to a predetermined reference and displays the generated partitioned areas on the display unit 12 (S300).

In this case, the processor 20 may generate the partitioned areas by using thinning or a Voronoi diagram as a method for the processor 20 to generate automatically partitioned areas.

The thinning is a method for extracting a frame of an image in image processing and to extract the frame of the image as a thin line with a lattice thickness and generate pixels to extract the frame of the path of the moving robot 2 by using a plurality of nodes configured in the image. In more detail, the moving robot 2 thins a traveling area of the moving robot 2 in the generated map to extract the frame of the path, that is, an outer line of the cleaning area. The processor 20 may set parts where the extracted outer line is finished or partitioned into several lines as nodes. Further, when the plurality of lines is connected to each other when analyzing the number of neighboring pixels around the pixel where the moving robot 2 is currently located, the processor 20 may determine a corresponding point as a branch node. The processor 20 finds one path along the pixels configuring the line from the branch node, partitions a pixel having a large curvature into the node in the found path again, and may repeat this process.

As another example of the method for generating the partitioned areas, the Voronoi diagram is a method of partitioning a space based on points separated from respective feature points at the same distance when many feature points exist on a Euclidean space. A Voronoi polygon includes a plurality of partial polygons and the respective partial polygons may be defined by the plurality of feature points selected for specifying each space. In this case, in each Voronoi polygon, a distance to a reference point of a polygon to which internal points belong is always closer than a distance from a reference point of another Voronoi polygon, and the Voronoi polygon is defined as a polygon formed when perpendicular bisectors between any feature point (reference point) and feature points adjacent to the reference point meet each other.

In the step of generating the partitioned areas, the remote control apparatus 1 may generate the partitioned areas and the moving robot 2 may generate the partitioned areas.

FIG. 10 is a diagram illustrating an area partitioned grid map according to an exemplary embodiment of the present invention. To help in understanding, referring to FIG. 8, the generated area is a partitioned grid map by using the thinning and the Voronoi diagram as the examples.

If the mode is not the automatic partitioned area mode, the remote control apparatus 1 determines whether to pre-set a cleaning mode for each area according to a designated area selected by the user (S400). If the area is not the designated area selected by the user, the processor 20 sets the mode to autonomous traveling of the moving robot 2 and the cleaning mode according to the autonomous traveling (S500).

If the area is the designated area selected by the user, the remote control apparatus 1 determines whether to pre-set a cleaning mode for each area according to a designated area selected by the user (S600). For example, when area 1, area 2, and area 3 which are partitioned areas in the generated map are present, the remote control apparatus 1 verifies whether to pre-set different cleaning modes for each area, such as an avoidance area as area 1, an intensive cleaning area as area 2, and an escape traveling area as area 3.

When the cleaning mode according to the designated area is not pre-set, the remote control apparatus 1 automatically determines the cleaning mode according to a predetermined algorithm (S700). For example, according to information measured from the sensors which are variously mounted on the moving robot 2, the processor 20 receives the information measured from the moving robot 2 and randomly performs and determines setting for each area. As an example, when a lot of dust concentration is detected from a pollutant concentration measuring sensor of the moving robot 2, the corresponding area which is currently located will be set as the intensive cleaning area. The cleaning mode set by the processor 20 may be periodically updated and the set information may be an operation which is temporarily set.

When the cleaning mode according to the designated area is pre-set, the processor 20 transmits a control signal according to the cleaning mode suitable for the corresponding designated area to the moving robot 2 (S800).

As such, when the cleaning modes according to the map creation and the partitioning area are all set, the map information is stored in the storage unit 40 of the remote control apparatus 1 and the memory unit 800 of the moving robot 2 and displayed on the display unit 12 (S900).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A remote control apparatus for remotely controlling a moving robot, the apparatus comprising:
   a user interface unit displaying a map associated with a traveling area of a moving robot and receiving a user command associated with an operation of the moving robot;
   a processor selecting at least a part of the map as a designated area for intensive cleaning, for avoidance travel, or for escape travel, and generating a control signal for remotely controlling the moving robot by considering the received user command; and
   a wireless communication unit transmitting the generated control signal to the moving robot and receiving a response signal depending on the control signal from the moving robot,
   wherein the processor selects an updated map transmitted from the moving robot or a previously stored map by comparing the updated map with the previously stored map, and
   wherein the user interface unit displays the selected map.

2. The remote control apparatus of claim 1, wherein the user command includes a touch input which a user inputs by a touch method in order to designate at least a partial area of the map displayed in the user interface unit.

3. The remote control apparatus of claim 2, wherein the touch input which the user inputs by the touch method in order to designate at least the partial area includes
   a first touch input for designating a first point included in the partial area,
   a second touch input for designating a second point included in the partial area, and
   a drag input connected to the second point by starting from the first point.

4. The remote control apparatus of claim 2, wherein the touch input which the user inputs by the touch method in order to designate at least the partial area includes
   a first touch input for defining a first point included in the partial area,
   a second touch input for designating a second point included in the partial area and adjacent to the first point, and
   a third touch input for designating a third point included in the partial area and adjacent to the second point.

5. The remote control apparatus of claim 1, wherein the moving robot is a robot cleaner and the user interface unit displays the map and the map is transmitted from the robot cleaner.

6. The remote control apparatus of claim 5, wherein the designated area depending on the user command is for intensive cleaning, and
   the processor generates a control signal to increase suction force for suctioning dust, decrease a traveling speed within the designated area, or allow the robot cleaner to repeatedly travel within the designated area, when the robot cleaner travels at the designated area.

7. The remote control apparatus of claim 1, wherein the processor generates partitioning areas acquired by partitioning a map in which the moving robot travels by using a thinning method extracting a boundary for each area or a Voronoi diagram.

8. The remote control apparatus of claim 7, wherein the processor
   extracts coordinates of the designated area selected according to the command of the user and an area with no obstacle in the partitioning area and fits the traveling area of the moving robot in an oval form by considering the extracted coordinates, and
   sets the operation execution direction of the moving robot based on a relatively longer line segment of horizontal and vertical line segments formed by an oval in the area fit by the oval.

9. The remote control apparatus of claim 1, wherein the processor selects the previously stored map when the processor determines that the updated map is similar to the previously stored map.

10. A moving robot control system for remotely controlling a moving robot, the system comprising:
    a moving robot;
    a remote control apparatus for remotely controlling the moving robot, which includes a user interface unit displaying a map associated with a traveling area of the moving robot and receiving a user command associated with an operation of the moving robot;
    a processor selecting at least a part of the map as a designated area for intensive cleaning, for avoidance travel, or for escape travel, and generating a control signal for remotely controlling the moving robot by considering the received user command; and
    a wireless communication unit transmitting the generated control signal to the moving robot and receiving a response signal depending on the control signal from the moving robot,
    wherein the processor selects an updated map transmitted from the moving robot or a previously stored map by comparing the updated map with the previously stored map, and
    wherein the user interface unit displays the selected map.

11. The moving robot control system of claim 10, wherein the user command includes a touch input which a user inputs by a touch method in order to designate at least a partial area of the map displayed in the user interface unit.

12. The moving robot control system of claim 11, wherein the touch input which the user inputs by the touch method in order to designate at least the partial area includes
   a first touch input for designating a first point included in the partial area,
   a second touch input for designating a second point included in the partial area, and
   a drag input connected to the second point by starting from the first point.

13. The moving robot control system of claim 10, wherein the moving robot is a robot cleaner.

14. The moving robot control system of claim 10, wherein the moving robot includes
   a traveling unit moving the moving robot,
   a cleaning unit cleaning an area where the moving robot travels,
   a transceiving unit receiving the control signal from the remote control apparatus and transmitting a response signal depending on the control signal,
   a sensing unit sensing an operation position of the moving robot according to the control signal, and
   an image acquiring unit acquiring an image of the traveling area.

15. The moving robot control system of claim 10, wherein the moving robot further includes a map creating unit creating a map associated with the traveling area of the moving robot according to at least one predetermined autonomous traveling mode.

16. The moving robot control system of claim 10, wherein the moving robot operates by considering the designated area according to the received control signal.

17. The moving robot control system of claim 10, further comprising:
   a server transferring a signal transmitted and received between the moving robot and the remote control apparatus.

18. A remote control method for remotely controlling a moving robot, the method comprising:
   creating, by the moving robot, a map by performing at least one predetermined traveling mode;
   receiving, by the remote control apparatus, an updated map transmitted from the moving robot;
   selecting, by the remote control apparatus, a previously stored map or the updated map by comparing the previously stored map and the updated map;
   displaying, by the remote control apparatus, the selected map;
   receiving, by the remote control apparatus, a user command associated with an operation of the moving robot;
   selecting, by the remote control apparatus, at least a part of the displayed map as a designated area for intensive cleaning, for avoidance travel, or for escape travel by considering the user command; and
   generating, by the remote control apparatus, a control signal for remotely controlling the moving robot.

19. The remote control method of claim 18, wherein in the selecting at least a part of the displayed map, the designation area is partitioned according to presence of an obstacle.

20. The remote control method of claim 18, wherein the moving robot is a robot cleaner and controlling the moving robot includes performing a cleaning and traveling operation.

* * * * *